United States Patent
Tahir

(10) Patent No.: US 12,421,112 B1
(45) Date of Patent: Sep. 23, 2025

(54) METAL ORGANIC FRAMEWORK DERIVED NANOCOMPOSITE CATALYST FOR SYNTHESIS GAS PRODUCTION

(71) Applicant: United Arab Emirates University, Al Ain (AE)

(72) Inventor: Muhammad Tahir, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/020,412

(22) Filed: Jan. 14, 2025

Related U.S. Application Data

(62) Division of application No. 18/810,622, filed on Aug. 21, 2024, now Pat. No. 12,234,150.

(51) Int. Cl.
*B01J 31/00* (2006.01)
*B01J 31/16* (2006.01)
*C01B 3/58* (2006.01)

(52) U.S. Cl.
CPC ........... *C01B 3/583* (2013.01); *B01J 31/1691* (2013.01)

(58) Field of Classification Search
None
See application file for complete search history.

(56) References Cited

PUBLICATIONS

Applied Catalysis B: Environmental, 244, 996-1003 (Year: 2019).*
Ren et al., "Self-templated synthesis of Co3O4 hierarchical nanosheets from a metal-organic framework for efficient visible-light photocatalytic CO2 reduction", Nanoscale, Jan. 2, 2020, vol. 12, No. 2, pp. 755-762. doi: 10.1039/c9nr08669b.
He et al., "2D/2D/0D TiO2/C3N4/Ti3C2 MXene composite S-scheme photocatalyst with enhanced CO2 reduction activity", Appl. Catal. B: Environ., 2020, vol. 272, 119006, 12 pages, https://doi.org/10.1016/j.apcatb.2020.119006.

* cited by examiner

*Primary Examiner* — Yun Qian
(74) *Attorney, Agent, or Firm* — MH2 Technology Law Group, LLP

(57) ABSTRACT

A method for photothermal synthesis gas production. The method comprises feeding methane and carbon dioxide into a photothermal reactor, the photothermal reactor comprising a catalyst. The catalyst comprises a metal organic framework (MOF) derived nanocomposite oxide catalyst, the MOF derived nanocomposite oxide catalyst being grown on titanium dioxide ($TiO_2$) quantum dots.

7 Claims, 7 Drawing Sheets

METAL ORGANIC FRAMEWORK DERIVED NANOCOMPOSITE CATALYST FOR SYNTHESIS GAS PRODUCTION

CROSS REFERENCE TO RELATED APPLICATIONS

This application is a divisional of U.S. application Ser. No. 18/810,622 filed 21 Aug. 2024, the entire disclosure of which is incorporated herein by reference.

FIELD

The present disclosure concerns metal organic framework (MOF) derived nanocomposite catalysts for synthesis gas production. More specifically, but not exclusively, the present disclosure concerns MOF derived nanocomposite oxide catalysts grown on titanium dioxide quantum dots for synthesis gas production, and method of photothermal synthesis gas production.

BACKGROUND

Background description includes information that will be useful in understanding the present invention. It is not an admission that any of the information provided herein is prior art or relevant to the presently claimed invention, or that any publication specifically or implicitly referenced is prior art.

In recent times, the energy demand of the human population has increased exponentially due to the rise in population and economic growth. The energy demand is typically catered through the burning of fossil fuels, which is expected to increase by 56% by the year 2040, leading to a steep increase in the carbon dioxide ($CO_2$) released into the atmosphere. 87% of $CO_2$ released by human sources is through the burning of fossil fuels, followed by 9% emission from land use changes, and another 4% of carbon dioxide released through industrial processes. Due to the excessive reliance on fossil fuel combustion for energy production, the depletion of fossil fuel reserves and environmental issues are becoming a major concern. The increase of $CO_2$ concentration in the atmosphere has intensified the greenhouse effect and climate change.

The increased risk of greenhouse gas related climate change has led to development and research into ways in which carbon dioxide ($CO_2$) can be removed from the atmosphere. Various efforts and methods have been deployed to reduce the $CO_2$ in the atmosphere, and to search for cleaner and more environmentally friendly solutions.

Greenhouse gas carbon dioxide ($CO_2$) is a significant contributor to climate change. When released into the atmosphere, $CO_2$ traps heat, leading to global warming and other climate-related disruptions.

Thermal catalysis, or thermo-catalysis, is one of the most common forms of catalysis, and has been suggested as a mechanism for $CO_2$ reduction. This is mainly attributed to its high efficiency and applicability for large-scale processes. The processes that are involved in thermal catalysis are adsorption of reactant molecules, activation of chemical bonds, formation of intermediates, conversion of intermediates to products and desorption of product molecules. Thermal energy is provided to enable the progression of chemical reactions by transformation of energy and achieving the activation energy, Ea. A considerable drawback of this method is the high operating cost and energy consumption.

Photocatalytic $CO_2$ reduction using solar energy has been suggested as an approach to supporting the mitigation of climate change by converting carbon dioxide, a greenhouse gas, into useful fuels and chemicals, using renewable solar energy.

However, existing photocatalytic systems are inefficient, with a low methane ($CH_4$) fuel evolution rate. Existing photocatalytic systems that reduce $CO_2$ yield very low amount of product, with the majority of the product consisting of carbon monoxide (CO).

Titanium dioxide has been suggested for use as a photocatalyst for such photocatalytic $CO_2$ reduction mechanisms. A disadvantage of this approach is that titanium dioxide is only active under UV light and has a low photocatalytic efficiency.

The present disclosure seeks to overcome one or more of the above-mentioned problems. More specifically, but not exclusively, the present disclosure seeks to provide an improved method for photothermal synthesis gas production.

SUMMARY

According to a first aspect of the present disclosure, there is provided a method for photothermal synthesis gas production. The method comprises the steps of feeding methane and carbon dioxide into a photothermal reactor, the photothermal reactor comprising a catalyst; and reforming the methane and carbon dioxide to produce carbon monoxide and hydrogen. The catalyst comprises a metal organic framework (MOF) derived nanocomposite oxide catalyst, the MOF derived nanocomposite oxide catalyst being grown on titanium dioxide (TiO2) quantum dots.

Photothermal catalysis advantageously reduces energy usage and at the same time boosts the efficiency of the $CO_2$ methanation reaction.

Photothermal catalysis may be defined as the combined action of electronic excitation via absorption of visible or ultraviolet radiation and thermal energy from infrared radiation or exothermic reactions. Photothermal catalysis may be described as photo-driven thermal catalysis, where solely solar energy acts as a heating source as well as to generate electron/hole pairs. Photothermal catalysis may be defined as the coupling of both solar energy and thermal energy in which photocatalysis and thermo-catalysis function in concert. In this case, photothermal catalysis can be induced by coupling both the photo- and thermal aspects by using external heating to drive the reaction and at the same time utilize light irradiation to induce photo-generated charge carriers to further enhance the catalytic reaction.

The inventors have surprisingly found that the nanocomposite oxide catalyst derived from a MOF exhibits narrow energy band gaps which allows it to absorb a broad wavelength of light, resulting in excellent optoelectronic properties.

The MOF may function as a sacrificial template to produce MOF derived oxide.

MOFs have been found to be advantageous in producing catalysts due to their high surface area to volume ratio and high porosity for effective gas capture. MOFs have also been found to be advantageous due to promising light absorption capabilities.

The oxide may be cobalt oxide ($Co_3O_4$).

The MOF may be cobalt based. The MOF may be ZIF-67.

The cobalt oxide may be three-dimensional (3D) cobalt oxide dodecahedral crystals.

The ZIF-67 may be calcined to produce the 3D cobalt oxide dodecahedral crystals.

The catalyst may comprise nitride. The nitride may be graphitic carbon nitride. The graphitic carbon nitride may be exfoliated graphitic carbon nitride.

The MOF derived nanocomposite oxide catalyst may be synthesized using a synthesis method comprising the steps: using a co-precipitation technique to create the MOF; and applying thermal treatment to the MOF to produce MOF derived oxide.

The thermal treatment may be calcination.

The catalyst may be a binary composite. The binary composite may comprise cobalt oxide and titanium dioxide.

The catalyst may be a ternary composite. The ternary composite may comprise cobalt oxide, titanium dioxide, and graphitic carbon nitride.

The synthesis method may further comprise synthesizing titanium dioxide using a sol-gel method.

The synthesis method may comprise loading the MOF derived oxide onto titanium dioxide by dispersing the MOF derived oxide and the titanium dioxide into a suspension.

The ratio of titanium dioxide to suspension may be between 0.1 g/ml and 0.01 g/ml. The ratio of titanium dioxide to suspension may be between 0.04 g/ml and 0.05 g/ml.

The ratio of titanium dioxide to suspension may be between 1 wt. % and 10 wt. %.

The synthesis method may comprise drying the suspension to produce the metal organic framework (MOF) derived nanocomposite oxide catalyst grown on titanium dioxide ($TiO_2$).

The titanium dioxide may be titanium dioxide nanodots (0D $TiO_2$).

This may be termed as in-situ growing of MOF derived nanocomposite on titanium dioxide.

This in-situ growing has been found to be advantageous in regulating the original morphology of MOF and 3D $Co_3O_4$. It has also been found that in-situ growing advantageously promotes heterojunction formation and potent interfacial contact over the catalyst. Morphological regulation is beneficial as it improves the interaction between the moieties for the composite catalysts. Through morphology and structural control, intimate interfacial contact can be achieved which can enhance the catalyst efficiency in converting greenhouse gas into renewable fuels It has also been found that well-dispersed 3D $Co_3O_4$ with 0D $TiO_2$ promoted a strong interfacial contact between the moieties, which augmented the solar thermal $CO_2$ conversion to with $CH_4$ produce renewable chemicals and fuels.

The synthesis method may further comprise synthesizing graphitic carbon nitride by heating melamine. The graphitic carbon nitride may be exfoliated graphitic carbon nitride.

The synthesis method may comprise mixing the MOF derived oxide and the graphitic carbon nitride in a liquid suspension; and drying the liquid suspension to produce the MOF derived nanocomposite oxide catalyst.

The ratio of graphitic carbon nitride to suspension may be between 0.1 g/ml and 0.01 g/ml. The ratio of graphitic carbon nitride to suspension may be between 0.04 g/ml and 0.05 g/ml.

The ratio of MOF derived oxide to suspension may be between 1 wt. % and 10 wt. %.

It has also been found that well-dispersed 3D $Co_3O_4$ with 2D exfoliated graphitic carbon nitrides promoted a strong interfacial contact between the moieties, which augmented the solar thermal $CO_2$ conversion to with $CH_4$ produce renewable chemicals and fuels.

The synthesis method may comprise synthesizing titanium dioxide using a sol-gel method. The step of mixing may comprise mixing the MOF derived oxide, the graphitic carbon nitride, and the titanium dioxide in the liquid suspension, such that the step of drying produces the MOF derived nanocomposite oxide catalyst grown on titanium dioxide ($TiO_2$), wherein the MOF derived nanocomposite oxide catalyst grown on titanium dioxide ($TiO_2$) is a ternary composite comprising exfoliated graphitic carbon nitride.

The MOF may be ZIF-67. The MOF derived oxide may be MOF derived cobalt oxide.

According to a second aspect of the present disclosure, there is provided a catalyst suitable for use as the catalyst of the first aspect, wherein the catalyst is a metal organic framework (MOF) derived nanocomposite oxide catalyst, the MOF derived nanocomposite oxide catalyst being grown on titanium dioxide ($TiO_2$) quantum dots The MOF derived nanocomposite oxide catalyst may be grown on titanium dioxide ($TiO_2$) quantum dots and graphitic carbon nitride.

According to a third aspect of the present disclosure, there is provided a photothermal reactor comprising the catalyst of the second aspect.

It will be understood that features disclosed in relation to one aspect of the present disclosure may be applicable to other aspects of the present disclosure, and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of photothermal synthesis gas production, and more particularly to photothermal synthesis gas production using MOF derived nanocomposite oxide catalyst being grown on titanium dioxide ($TiO_2$).

The principles of the present invention and their advantages are best understood by referring to FIG. 1a to FIG. 7b. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1A:
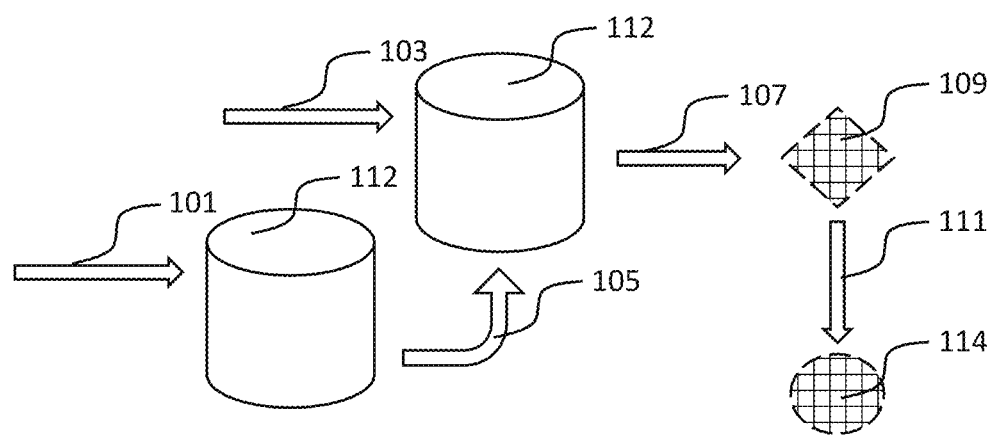
FIG. 1a shows a method of synthesizing MOF derived cobalt oxide according to an embodiment of the present disclosure.

FIG. 1a shows a method of synthesizing MOF derived cobalt oxide according to an embodiment of the present disclosure.

A co-precipitation technique is used to create the cobalt-based ZIF-67 MOF. First, 75 mL of methanol 112 is used to dissolve 5.46 g of Cobalt (II) nitrate hexahydrate ($Co(NO_3)_2 \cdot 6H_2O$) 103, which is then stirred magnetically for 30 minutes.

Next, another 75 mL of methanol 112 is used to dissolve 6.16 g of 2-methylimidazole 101. After adding the 2-methylimidazole combination to the cobalt mixture dropwise 105, the mixture was vigorously stirred with a magnetic stirrer for a further six hours at room temperature. ZIF-67 MOF crystals 109 were obtained by drying 107 the purple suspension in an oven at 80° C. for an entire night following three rounds of methanol washing.

The ZIF-67 MOF 109 then undergoes thermal treatment 111 to become $Co_3O_4$ 114. To produce the final product of $Co_3O_4$ 114 powders, ZIF-67 crystals are first placed in a crucible and then calcined for 4 hours at 350° C. in a muffle furnace.

Figure 1B:
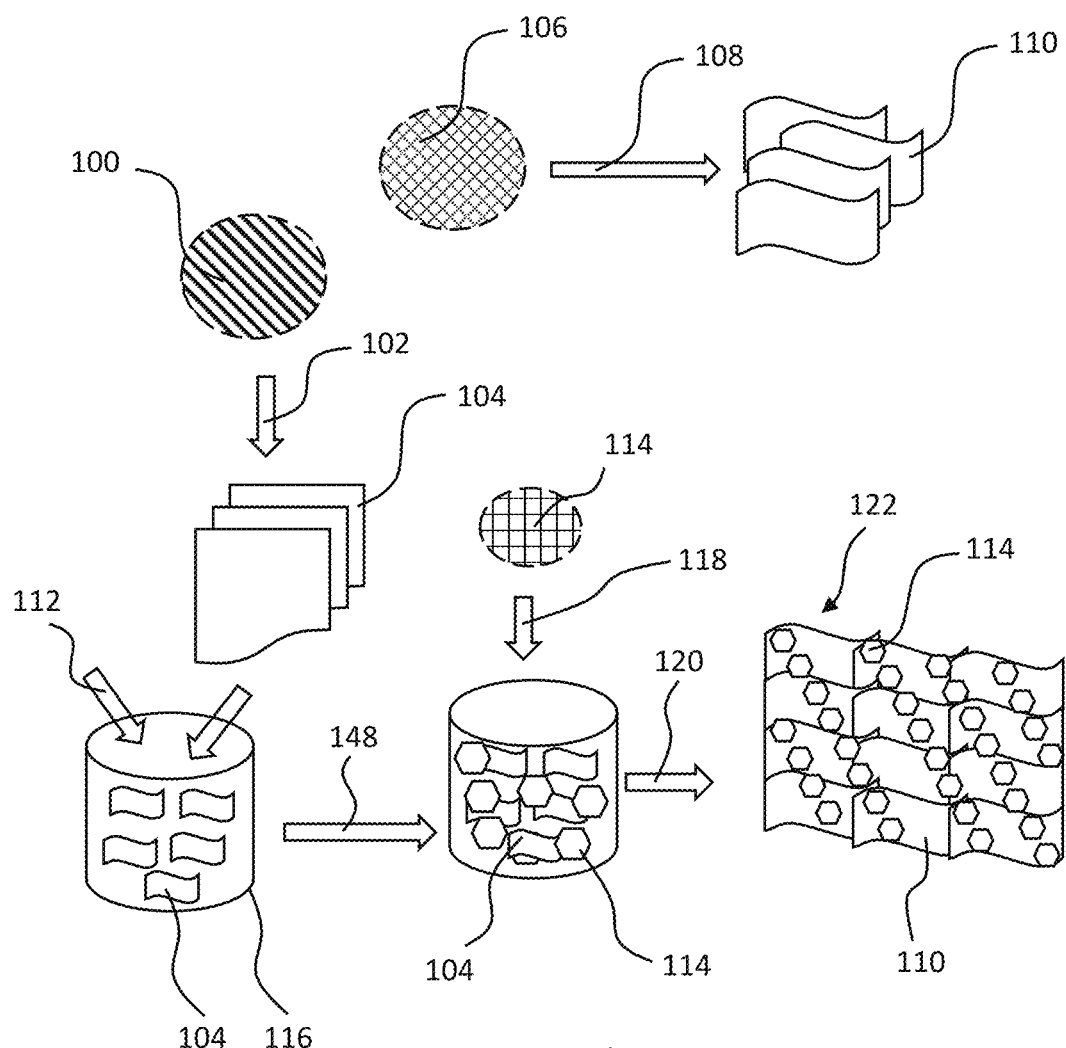
FIG. 1b shows a method of synthesizing MOF derived nanocomposite cobalt oxide catalyst according to an embodiment of the present disclosure.

FIG. 1b shows a method of synthesizing MOF derived nanocomposite cobalt oxide catalyst according to an embodiment of the present disclosure.

Graphitic carbon nitride 104 is produced using a melamine 100 precursor. The melamine 100 precursor is thermally decomposed 102 at 500° C. for 2 hours to arrive at graphitic carbon nitride 104.

In embodiments, the graphitic carbon nitride is two dimensional graphitic carbon nitride nanosheets (2D $g-C_3N_4$).

For the synthesis of exfoliated graphitic carbon nitride (ECN) 110, a mixture of melamine and urea 106 is used. Melamine and urea 106 in equal amounts are mixed and placed in a ceramic crucible before being heated 108 to 550° C. for the duration of 2 hours. The gas produced by the decomposition of urea is used to exfoliate graphitic carbon nitride layers and produce defective graphitic carbon nitride with oxygen vacancies. The product obtained is grinded to a fine powder and is given the name exfoliated graphitic carbon nitride (ECN) 110.

It has been found that synthesizing exfoliated 2D nanosheets of graphitic carbon nitrides with the use of the method using melamine/urea with controlled thermal decomposition conditions results in a larger surface area and higher charge separation efficiency.

The $Co_3O_4/g-C_3N_4$ composites 122 were synthesized using a self-assembly approach. For this purpose, $Co_3O_4$ 114 and $g-C_3N_4$ 104 were used as discussed previously. First, $g-C_3N_4$ 104 of specific quantity (0.2 to 1 g) was dispersed in methanol 112 (5 to 20 mL) and stirred 148 for a specific time (1 to 4 hours) to get good dispersion in suspension 116. In the next step, specific amount of $Co_3O_4$ 114 (1 to 10 wt. %) is dispersed in methanol and is added 118 to the above suspension 116 under stirring and the solution was stirred for another 4 hours in addition to ultrasonic to get well-dispersed $Co_3O_4$-loaded $g-C_3N_4$. The solution was finally dried 120 in an oven at 100° C. overnight to get a $Co_3O_3/g-C_3N_4$ composite 122.

In embodiments, the $Co_3O_3/g-C_3N_4$ composite is a binary composite.

Figure 1C:
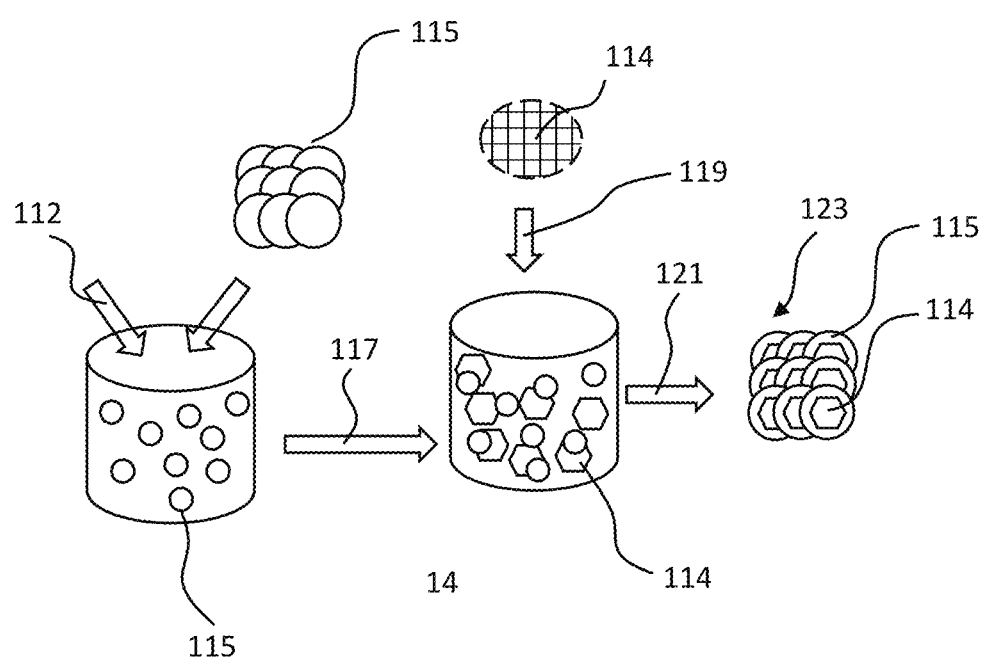
FIG. 1c shows a method of synthesizing MOF derived nanocomposite cobalt oxide catalyst according to an embodiment of the present disclosure.

FIG. 1c shows a method of synthesizing MOF derived nanocomposite cobalt oxide catalyst according to an embodiment of the present disclosure.

The $Co_3O_4/TiO_2$ composites 123 are synthesized using a self-assembly approach. For this purpose, titanium dioxide ($TiO_2$) 115 is used, which is synthesized using the sol-gel method. The sol-gel method results in $TiO_2$ quantum dots. First, $TiO_2$ 115 of specific quantity (0.2 to 1 g) is dispersed in methanol 112 (5 to 20 mL) and stirred 117 for a specific time (1 to 4 hours) to get good dispersion.

In the next step, a specific amount of $Co_3O_4$ 114 (1 to 10 wt. %) dispersed in methanol is added to the above suspension under stirring 119 and the solution is then stirred for another 4 hours in addition to ultrasonic application to get well-dispersed $Co_3O_4$-loaded $TiO_2$. The solution is finally dried 121 in an oven at 100° C. overnight to get a $Co_3O_4/TiO_2$ composite 123.

In embodiments, the $Co_3O_4/TiO_2$ composite is a binary composite.

In embodiments, $Co_3O_4$/0D TiO2 binary composite is synthesized using an in-situ growing method of ZIF-derived 3D $Co_3O_4$ over titania ($TiO_2$) quantum dots. This method is termed a solvothermal synthesis method and is designed to achieve easy morphological regulation of MOF derivatives in the final binary composites.

In embodiments, the method of synthesizing MOF derived nanocomposite cobalt oxide catalyst is a method of synthesizing MOF derived nanocomposite cobalt oxide catalyst, wherein the composite is a ternary composite. In embodiments, the ternary composite comprises titanium dioxide, cobalt oxide, and graphitic carbon nitride.

In embodiments, The ternary oxides/nitrides composites of three dimensional cobalt oxide coupled with two dimensional exfoliated graphitic carbon nitride and titanium dioxide nano dots ($3DCo_3O_4/2D$ $E-gC_3N_4/0D$ $TiO_2$) with hierarchical nanotexture were synthesized using an ultrasonic approach with good interface interaction, Schottky formation, maximum band structure position and good stability under photothermal conditions at low-temperature range.

The ultrasonic approach may comprise a combination of the steps of FIG. 1b and FIG. 1c. The ultrasonic approach for synthesizing the ternary composite may comprise dispersing $TiO_2$ of specific quantity (0.2 to 1 g) in methanol (5 to 20 mL) and stirring for a specific time (1 to 4 hours) to get good dispersion. The method may also comprise dispersing g-$C_3N_4$ of specific quantity (0.2 to 1 g) in methanol (5 to 20 mL) and stirring for a specific time (1 to 4 hours) to get good dispersion in suspension. The method may also comprise mixing the g-$C_3N_4$ dispersion with the $TiO_2$ dispersion. The method may comprise mixing $Co_3O_4$ with methanol and adding it to the g-$C_3N_4$—$TiO_2$ mixture. In embodiments, the $Co_3O_4$ mixed with methanol is added to either the g-$C_3N_4$ dispersion or the $TiO_2$ dispersion first, and then mixed. The method may then comprise drying the final mixture to arrive at the ternary composite.

It has been found that the ternary composite exhibits a higher oxidation potential.

Figure 2:
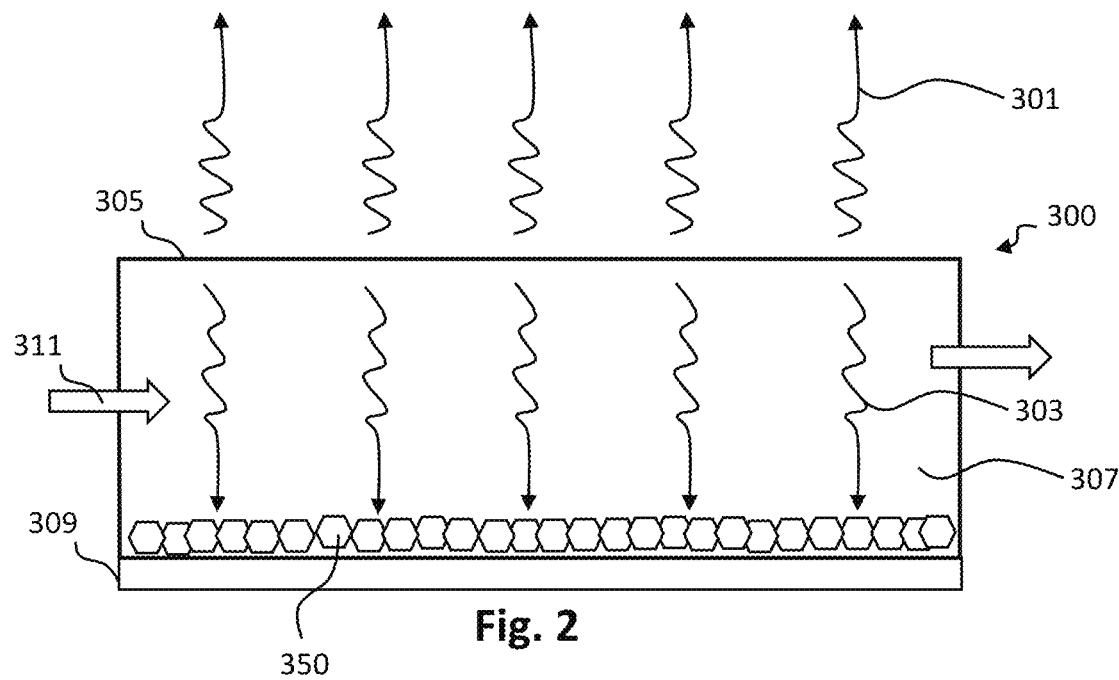
FIG. 2 shows a photoreactor according to an embodiment of the present disclosure.

FIG. 2 shows a photoreactor according to an embodiment of the present disclosure.

A continuous flow stainless steel fixed bed photothermal reactor 300 is used to carry out the photocatalytic, thermochemical and photothermal driven $CO_2$ reforming of methane ($CH_4$) reaction. The reactor comprises a main reactor chamber 307, a glass window 305 to pass the light and a heating jacket 309 to control the reactor temperature. The catalyst 350 is placed inside the reactor's bottom surface with a loading amount of 150 mg and it can be varied from 50 to 250 mg. The feed mixture 311 comprises $CO_2$ and $CH_4$ with a feed ratio of 1:1. The gas 311 is flowed through the reactor at a flow rate of 15 mL/min and is kept constant in at steady state.

In embodiments, depending on the size of the photoreactor, the flowrates and quantities of catalyst may be different as required by the scale.

In embodiments, the temperature of the reactor is greater than 25° C. In embodiments, the temperature of the reactor is greater than 100° C. In embodiments, the temperature of the reactor is greater than 150° C.

Transmitted light 303 passes into the photoreactor to initiate the reaction process. Typically, some light 301 is reflected off the reactor surface. The intensity of the sunlight is typically in the region of 100 mW/cm2.

Experiments

The photothermal reactor of FIG. 2 was used to conduct experiments on the efficacy of the catalysts.

The following experiments were conducted:
- $CO_2$ reforming with $CH_4$ over $Co_3O_4$/g-$C_3N_4$ ($Co_3O_4$ loading: 1 to 5 wt. %) at 100° C. and with light;
- $CO_2$ reforming with $CH_4$ over 3% $Co_3O_4$/g-$C_3N_4$ at different temperatures from 25 to 200° C. and with light;
- $CO_2$ reforming with $CH_4$ over 3% $Co_3O_4$/g-$C_3N_4$ at different temperatures from 100 to 200° C. and without light;
- $CO_2$ reforming with $CH_4$ over $Co_3O_4$/$TiO_2$ ($Co_3O_4$ loading: 1 to 5 wt. %) at 100° C. and with light;
- $CO_2$ reforming with $CH_4$ over 3% $Co_3O_4$/$TiO_2$ at different temperatures from 25 to 200° C. and with light; and
- $CO_2$ reforming with $CH_4$ over 3% $Co_3O_4$/$TiO_2$ at different temperatures from 100 to 200° C. and without light.

Figure 3:
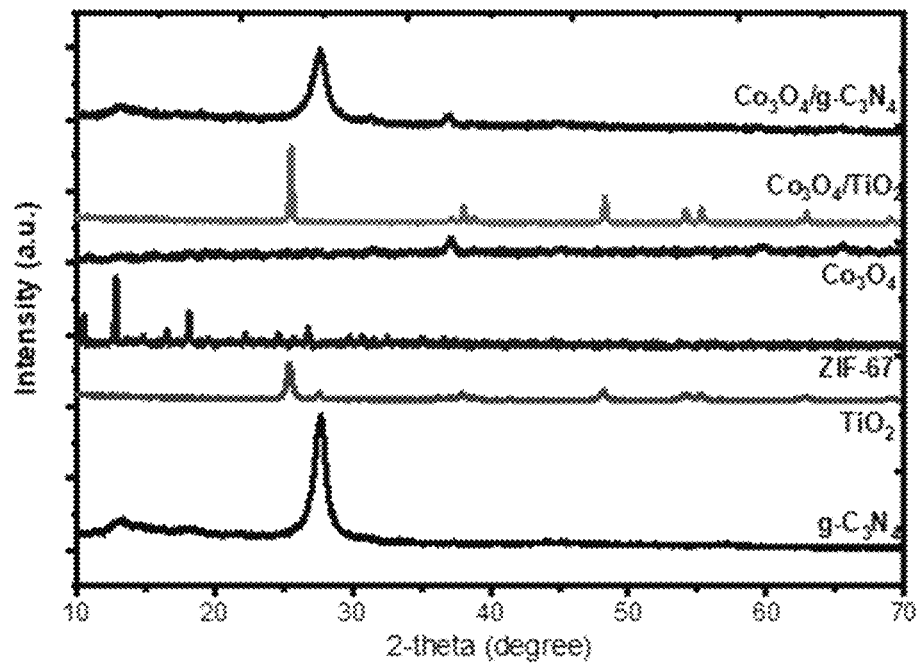
FIG. 3 shows x-ray diffraction analysis of g-$C_3N_4$, ZIF-67, MOF-derived $Co_3O_4$ and their $Co_3O_4$-based composites, according to an embodiment of the present disclosure.

FIG. 3 shows x-ray diffraction (XRD) analysis of g-$C_3N_4$, ZIF-67, MOF-derived $Co_3O_4$ and their $Co_3O_4$-based composites.

The peaks observed at 2-theta (2θ) of 12.85° were related (100) crystal planes of g-$C_3N_4$, whereas, a strong peak at 2θ of 27.47° reflects the (002) crystal plane of g-$C_3N_4$ having a typical aromatic ring with interlayers. The anatase phase of $TiO_2$ is represented by the diffraction peaks in the XRD patterns of pure $TiO_2$ that belong to the lattice plans of (101), (004), (200), (220), and (215). On the other hand, a different lattice design at (110) verifies the existence of a smaller-sized rutile phase of $TiO_2$. The as-prepared ZIF-67 showed peaks at 10.36°, 12.71°, 14.68°, 16.41°, 17.96°, 22.06°, 24.47°, 26.56° and 29.61° corresponding to (002), (112), (022), (013), (222), (114), (233), (134) and (044), respectively, with the highest peak at 7.33° showing the (011) plane. $Co_3O_4$ is successfully generated by thermally heating ZIF-67 at 350° C. for 4 hours, as evidenced by the characteristic peaks at 2θ=19.09°, 31.3°, 36.9°, 45.0°, 59.47°, and 65.31°. For the composite $Co_3O_4$/$TiO_2$ and $Co_3O_4$/g-$C_3N_4$, all the peaks related to $Co_3O_4$, g-$C_3N_4$ and $TiO_2$ were present, which confirms the successful synthesis of these composites.

Field emission scanning electron microscopy (FESEM) was conducted to understand the dimensionality, morphology, and structure of the prepared samples. ZIF-67 exhibited uniform three-dimensional (3D) dodecahedral particles with smooth surfaces. The morphology of $Co_3O_4$ was similar to ZIF-67 with a 3D dodecahedron structure. However, $Co_3O_4$ surfaces were relatively rough without obvious edges when it was compared to ZIF-67. Uniform size and shape of $TiO_2$ particles was also observed. The morphology of g-$C_3N_4$ had a 2D layered structure. When $Co_3O_4$ was added to g-$C_3N_4$, there was no change in morphology, however, $Co_3O_4$ was uniformly spread over the g-$C_3N$ surface to provide a heterojunction among the two materials. This shows that self-assembly is a promising approach to produce 3D/2D heterojunction composites.

It was also seen that $Co_3O_4$ with large sizes and clear edges are distributed within the $TiO_2$ particles. With high magnification a 3D $Co_3O_4$ dodecahedron structure can be observed. All these results further support the successful synthesis of single materials and binary composites with controlled structure and morphology.

Figure 4A:
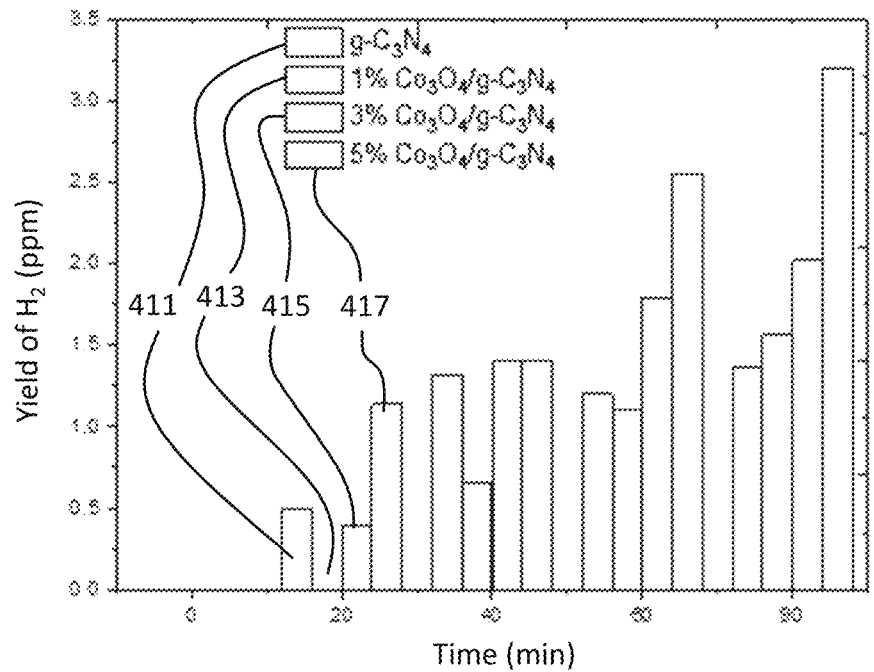
FIGS. 4a and 4b show the performance of pure g-$C_3N_4$ and various $Co_3O_4$ (1 to 5 wt. %) loaded g-$C_3N_4$ samples at different reaction times, according to an embodiment of the present disclosure.

FIG. 4a shows the yield of $H_2$ of pure g-$C_3N_4$ and various $Co_3O_4$ (1 to 5 wt. %) loaded g-$C_3N_4$ samples at different reaction times.

It can be seen that the production of $H_2$ is fairly consistent across the entire reaction time, evidenced by the steady increase in the total yield over time.

The production of $H_2$ was very small with pure g-$C_3N_4$ 411 and there was no significant impact on the yield of $H_2$ with 1% $Co_3O_4$ 413 loading. However, when $Co_3O_4$ loading was increased to 3 wt. % 415 and 5 wt. % 417, a significant amount of $H_2$ was produced.

Figure 4B:
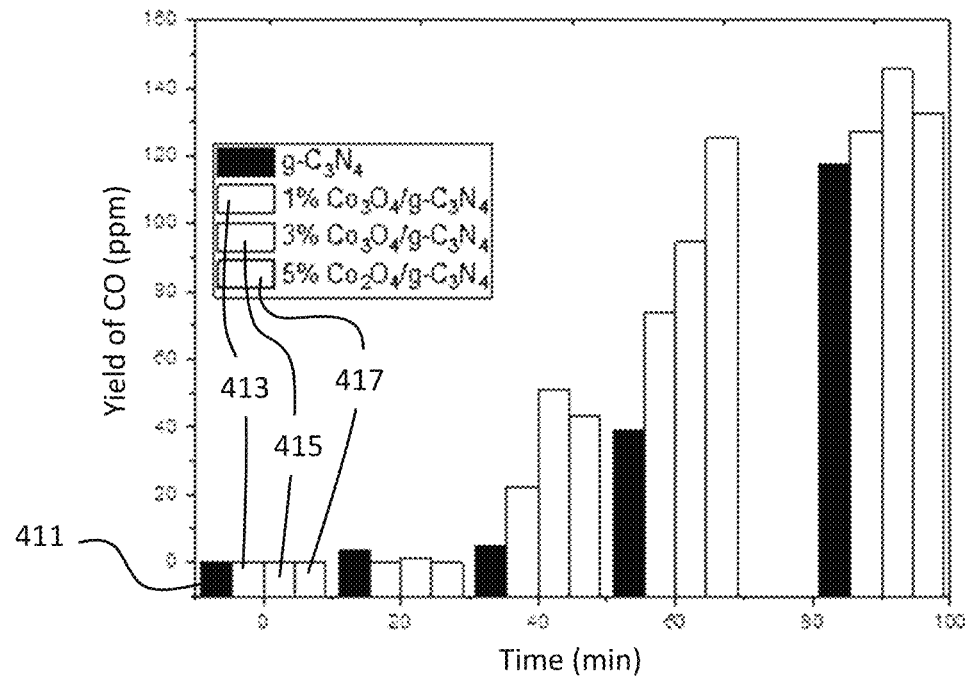

FIG. 4b shows the yield of carbon monoxide (CO) of pure g-$C_3N_4$ and various $Co_3O_4$ (1 to 5 wt. %) loaded g-$C_3N_4$ samples at different reaction times.

The production of CO was very small with pure g-$C_3N_4$ 411, however, CO yield was significantly increased with 1% $Co_3O_4$ 413 loading. The highest yield of CO was obtained with 3 wt. % $Co_3O_4$ 415 loading into g-$C_3N_4$. However, when $Co_3O_4$ loading was increased to 5 wt. % 417, the production of CO was decreased.

The trends for CO and $H_2$ production over $Co_3O_4$/g-$C_3N_4$ composites were different during $CO_2$ reforming of $CH_4$ reactions. The production of $H_2$ was increased with $Co_3O_4$ loading, which shows it is beneficial to maximize hydrogen production. On the other hand, production of CO was decreased with higher $Co_3O_4$ loading, which was possibly due to the photocatalytic effect. The increasing $Co_3O_4$ may increase the charge recombination centres and also more active sites to active sides reactions. Overall, $Co_3O_4$/g-$C_3N_4$ composite was more selective to produce CO during dry reforming of methane reaction.

Figure 5A:
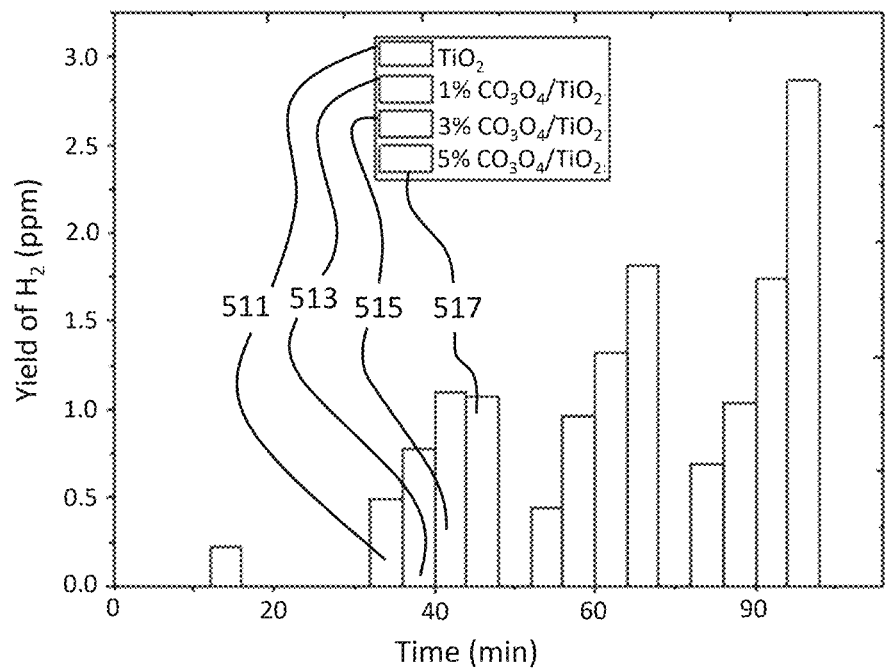
FIGS. 5a and 5b show the performance of pure $TiO_2$ and various $Co_3O_4$ (1 to 5 wt. %) loaded $TiO_2$ samples at different reaction times according to an embodiment of the present disclosure.

FIG. 5a shows the yield of $H_2$ of pure $TiO_2$ and various $Co_3O_4$ (1 to 5 wt. %) loaded $TiO_2$ samples at different reaction times.

Again, it is clear that the production rate of $H_2$ is fairly continuous over the entire reaction time.

The production of $H_2$ was lower with pure $TiO_2$ 511 and there was no significant impact on the yield of $H_2$ with 1% $Co_3O_4$ 513 loading. However, when $Co_3O_4$ loading was increased to 3 wt. % 515 and 5 wt. % 517, a significant amount of $H_2$ was produced.

In embodiments, the $Co_3O_4$ loading is between 3 wt. % and 5 wt. %.

Figure 5B:
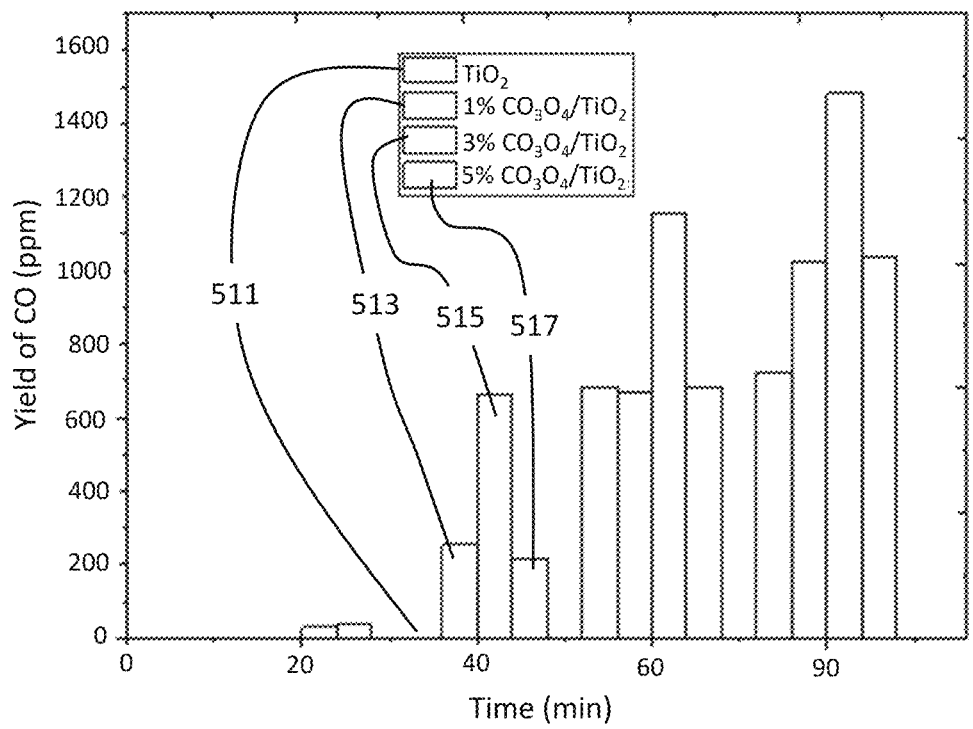

FIG. 5b shows the yield of CO of pure $TiO_2$ and various $Co_3O_4$ (1 to 5 wt. %) loaded $TiO_2$ samples at different reaction times.

The production of CO was very small with pure $TiO_2$ 511; however, CO yield was significantly increased with 1% $Co_3O_4$ 513 loading. The highest yield of CO was obtained with 3 wt. % $Co_3O_4$ 515 loading into $g$-$C_3N_4$. However, when $Co_3O_4$ loading was increased to 5 wt. % 517, the production of CO was decreased.

The trends for CO and $H_2$ production over $Co_3O_4$/$TiO_2$ composites were different during $CO_2$ reforming of $CH_4$ reactions. The production of $H_2$ was increased with $Co_3O_4$ loading, which shows it is beneficial to maximize hydrogen production. On the other hand, production of CO was decreased with higher $Co_3O_4$ loading, which was possibly due to the photocatalytic effect. The increasing $Co_3O_4$ may increase the charge recombination centres and also more active sites to active site reactions. Overall, the $Co_3O_4$/$TiO_2$ composite was more selective in producing CO during dry reforming of the methane reaction.

Figure 6A:
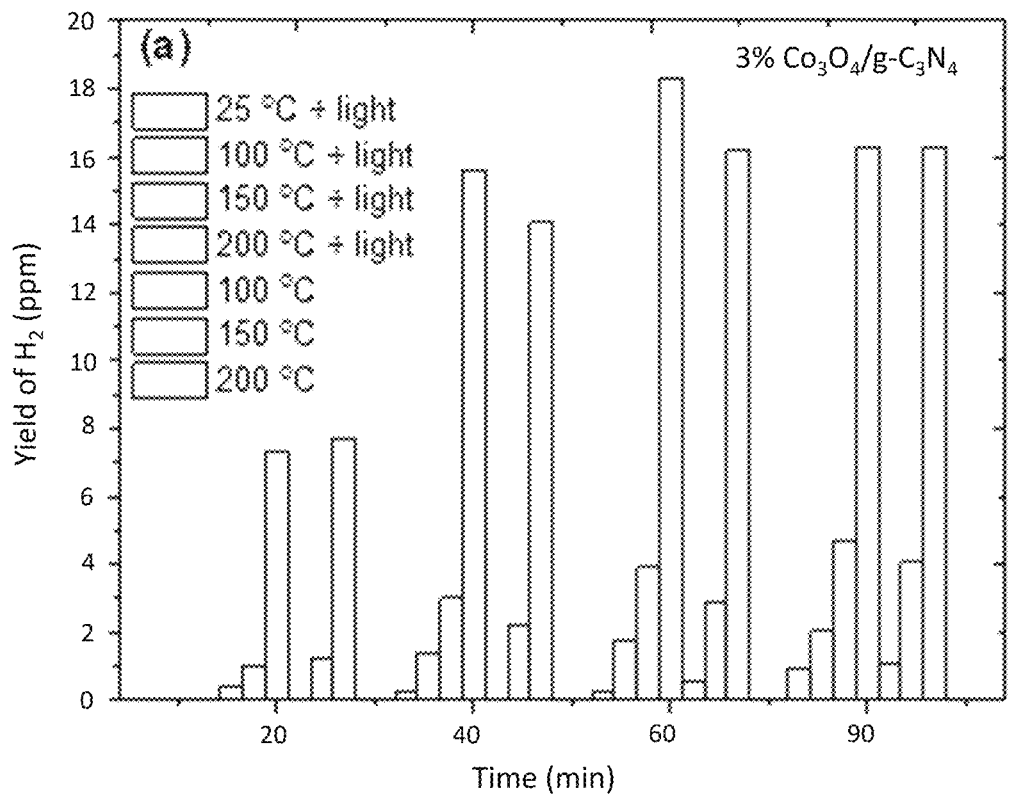
FIGS. 6a and 6b show the effect of temperature (25 to 200° C.) on the conversion of $CO_2$ with $CH_4$ to produce $H_2$ and CO according to an embodiment of the present disclosure.

FIG. 6a shows the production of $H_2$ at different reaction temperatures with light and without light using 3% $Co_3O_4$/$g$-$C_3N_4$ composite catalyst. It was observed that the production of hydrogen was increased with the increase of temperature, and its yield was higher when both the light and the temperature were used through the photothermal process. This was evidently due to the higher stability of methane and its need for higher activation energy, which can be minimized using a hybrid system.

There are seven bars represented in the chart for each time period, with the bars representing, from left to right: 25° C.+light; 100° C.+light; 150° C.+light; 200° C.+light; 100° C. (no light); 150° C. (no light); and 200° C. (no light) respectively.

Figure 6B:
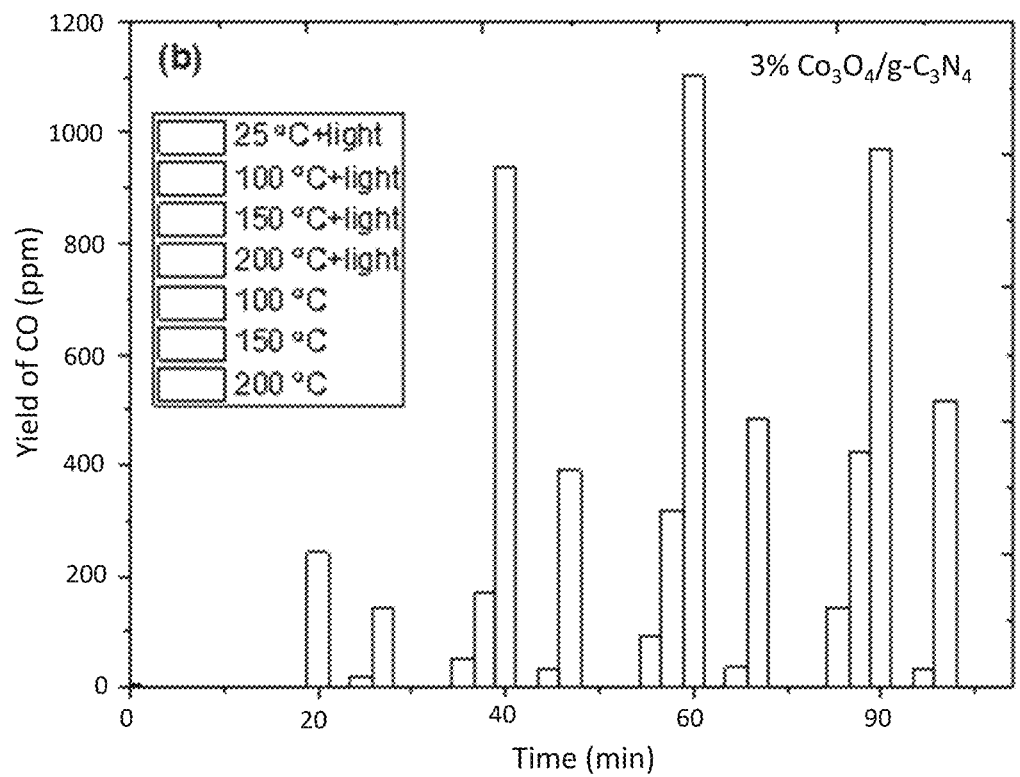

FIG. 6b shows the production of CO over 3% $Co_3O_4$/$g$-$C_3N_4$ composite at different temperatures and photothermal conditions. The sequence of conditions represented by the bars are in the same order and arrangement as that of FIG. 6a.

Interestingly, it is observed that without light and using only thermal conditions, the yield of CO was very small, however, when both the light and the temperature were employed, the yield of CO was significantly increased. These results confirm that photothermal with the use of light and heat over $Co_3O_4$/$g$-$C_3N_4$ is a promising approach to convert $CO_2$ and $CH_4$ through dry reforming process to produce CO and $H_2$.

Figure 7A:
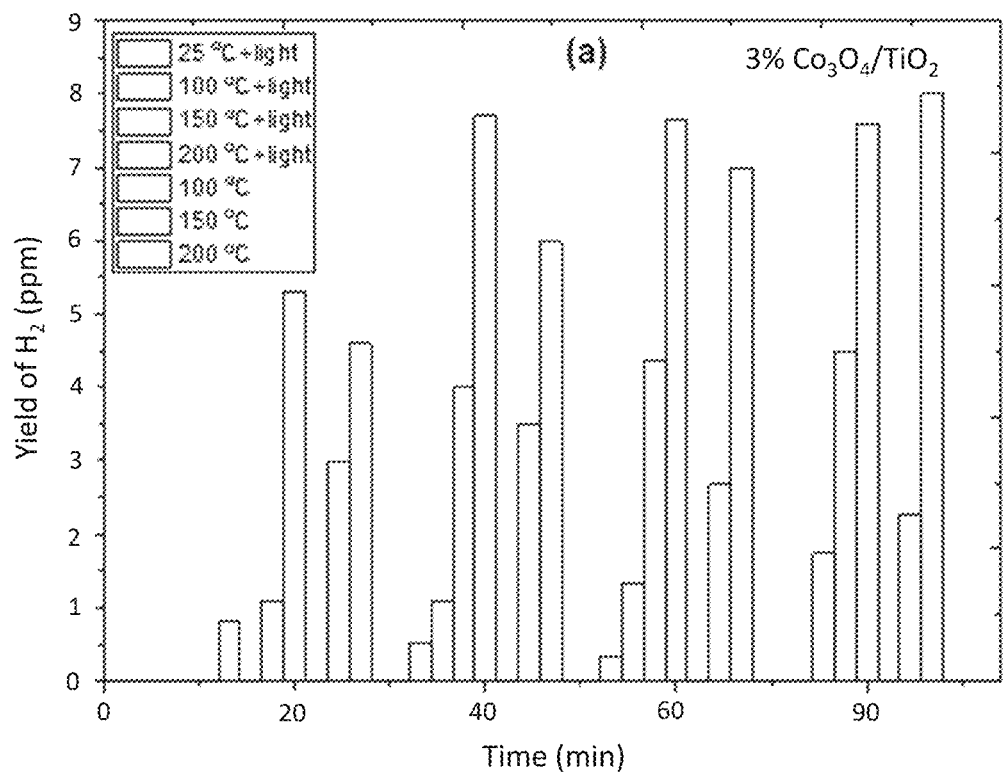
FIGS. 7a and 7b show the effect of temperature (25 to 200° C.) on the conversion of $CO_2$ with $CH_4$ to produce $H_2$ and CO, according to an embodiment of the present disclosure.

FIG. 7a shows the production of $H_2$ at different reaction temperatures with light and without light using 3% $Co_3O_4$/$TiO_2$. The sequence of conditions represented by the bars are in the same order and arrangement as that of FIG. 6a.

It was observed that the production of hydrogen was increased with the increase of temperature, and its yield was higher when both the light and the temperature were used through the photothermal process. This was due to the higher stability of methane and it need higher activation energy, which can be minimized using a hybrid system.

Figure 7B:
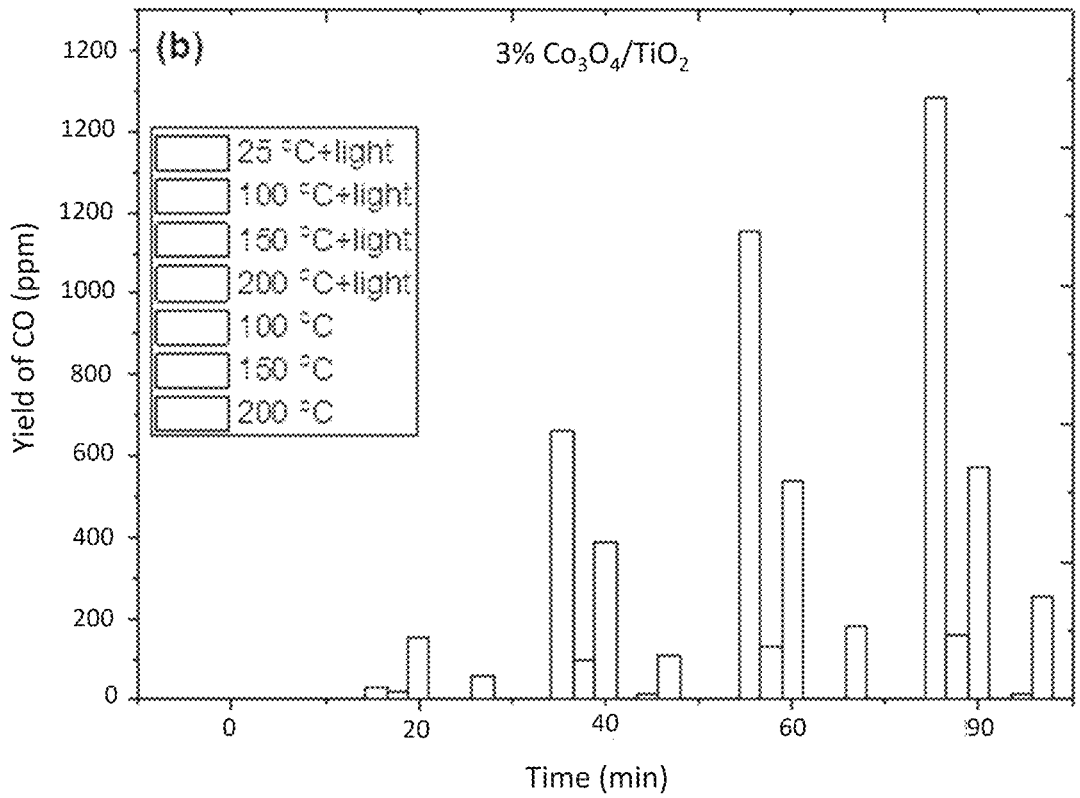

FIG. 7b shows the production of CO over 3% $Co_3O_4$/$TiO_2$ composite at different temperatures and photothermal conditions. The sequence of conditions represented by the bars are in the same order and arrangement as that of FIG. 6a.

Interestingly, it can be observed that without light and using only thermal conditions, the yield of CO was very small, however, when both the light and the temperature were employed, the yield of CO was significantly increased. These results confirm that photothermal with the use of light and heat over $Co_3O_4$/$TiO_2$ is a promising approach to convert $CO_2$ and $CH_4$ through a dry reforming process to produce CO and $H_2$.

It has been found that both the $Co_3O_4$/$g$-$C_3N_4$ and $Co_3O_4$/$TiO_2$ composites increased the production of $H_2$ and CO, with a loading of about 3% $Co_3O_4$ yielding good results.

3D $Co_3O_4$ according to the present disclosure can be an efficient sensitizer, and can be used as a catalyst/cocatalyst with semiconductors to increase charge separation efficiency, electrical conductivity, and solar energy harvesting efficiency.

Synthesizing TiO2 nanoparticles with the sol-gel method with suitable operating conditions has been found to be beneficial to adjusting surface area, light harvesting efficiency and charge separation productivity under solar energy irradiation.

Furthermore, the highest yield of CO was obtained when the reaction temperature of 100° C. was used with the light energy. When the temperature was increased to 150 and 200° C., the production of CO was decreased. These results can be explained based on the adsorption-desorption process. Using a higher temperature of more than 100° C., there is possible desorption of reactants over the catalyst surface, which lowers the catalytic activity. When the reaction was conducted without light, there was very small amount of CO formation, which shows at lower temperatures, reaction with $Co_3O_4$/$TiO_2$ composite is more dependent on the light energy than using heat energy. This can be further confirmed by the results of 200° C., in which the yield of CO was increased without light, the yield of CO was increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. A method for photothermal synthesis gas production, the method comprising the steps of:
    feeding methane and carbon dioxide into a photothermal reactor, the photothermal reactor comprising a catalyst;
    reforming the methane and carbon dioxide to produce carbon monoxide and hydrogen;

wherein the catalyst comprises a metal organic framework (MOF) derived nanocomposite oxide catalyst, wherein the oxide is three-dimensional (3D) cobalt oxide dodecahedral crystals, the MOF derived nanocomposite oxide catalyst being grown on titanium dioxide ($TiO_2$) quantum dots, wherein the MOF derived nanocomposite oxide catalyst is derived synthesized using a synthesis method comprising the steps:
using a co-precipitation technique to create an MOF; and
applying thermal treatment to the MOF to produce the MOF derived nanocomposite oxide catalyst.

2. The method according to claim 1, wherein the synthesis method further comprises:
synthesizing titanium dioxide using a sol-gel method;
loading the MOF derived oxide onto the titanium dioxide by dispersing the MOF derived oxide and the titanium dioxide into a suspension; and
drying the suspension to produce the metal organic framework (MOF) derived nanocomposite oxide catalyst grown on titanium dioxide ($TiO_2$).

3. The method according to claim 1, wherein the catalyst further comprises graphitic carbon nitride, and wherein the synthesis method further comprises:
synthesizing the graphitic carbon nitride by heating melamine.

4. The method according to claim 3 wherein the graphitic carbon nitride is exfoliated graphitic carbon nitride.

5. The method according to claim 3, wherein the synthesis method comprises:
mixing the MOF derived oxide and the graphitic carbon nitride in a liquid suspension; and
drying the liquid suspension to produce the MOF derived nanocomposite oxide catalyst.

6. The method according to claim 5 wherein the synthesis method comprises:
synthesizing titanium dioxide using a sol-gel method;
wherein the step of mixing comprises mixing the MOF derived oxide, the graphitic carbon nitride, and the titanium dioxide in the liquid suspension, such that the step of drying produces the MOF derived nanocomposite oxide catalyst grown on titanium dioxide ($TiO_2$), wherein the MOF derived nanocomposite oxide catalyst grown on titanium dioxide ($TiO_2$) is a ternary composite comprising exfoliated graphitic carbon nitride.

7. The method according to claim 1, wherein the MOF is ZIF-67.

* * * * *